United States Patent [19]

Herron et al.

[11] 3,867,567

[45] Feb. 18, 1975

[54] ELECTRONIC DATA TERMINAL INTERFACE

[75] Inventors: Roger G. Herron, Dunedin, Fla.; David B. Freitag, Bellevue, Wash.

[73] Assignee: GTE Automatic Electric Laboratories Incorporated, Northlake, Ill.

[22] Filed: Oct. 11, 1973

[21] Appl. No.: 405,374

[52] U.S. Cl. ................ 178/3, 178/70 TS, 179/84 A

[51] Int. Cl. ........................................... H04m 1/26

[58] Field of Search .......... 178/70 R, 70 TS, 88, 68, 178/66, 2, 3, 17 R; 179/2 DP, 84 R, 99; 340/345, 346, 365 R; 235/61 PD, 61 PE, 61 PM, 61.7 B

[56] References Cited

UNITED STATES PATENTS

| | | | |
|---|---|---|---|
| 3,148,286 | 9/1964 | Pickering et al. | 178/70 TS |
| 3,206,728 | 9/1965 | Baumgart et al. | 340/365 R |
| 3,465,289 | 9/1969 | Klein | 235/61.7 B |
| 3,688,038 | 8/1972 | Hugyecz et al. | 179/84 R |
| 3,766,325 | 10/1973 | Hatfield et al. | 179/99 |

*Primary Examiner*—Thomas A. Robinson
*Attorney, Agent, or Firm*—John T. Winburn

[57] ABSTRACT

An interface circuit for use between a data terminal and a data system for providing level shifting and isolation and having a receive channel that is powered by the same power supply as the transmit channel which is normally furnished with the data terminal.

7 Claims, 1 Drawing Figure

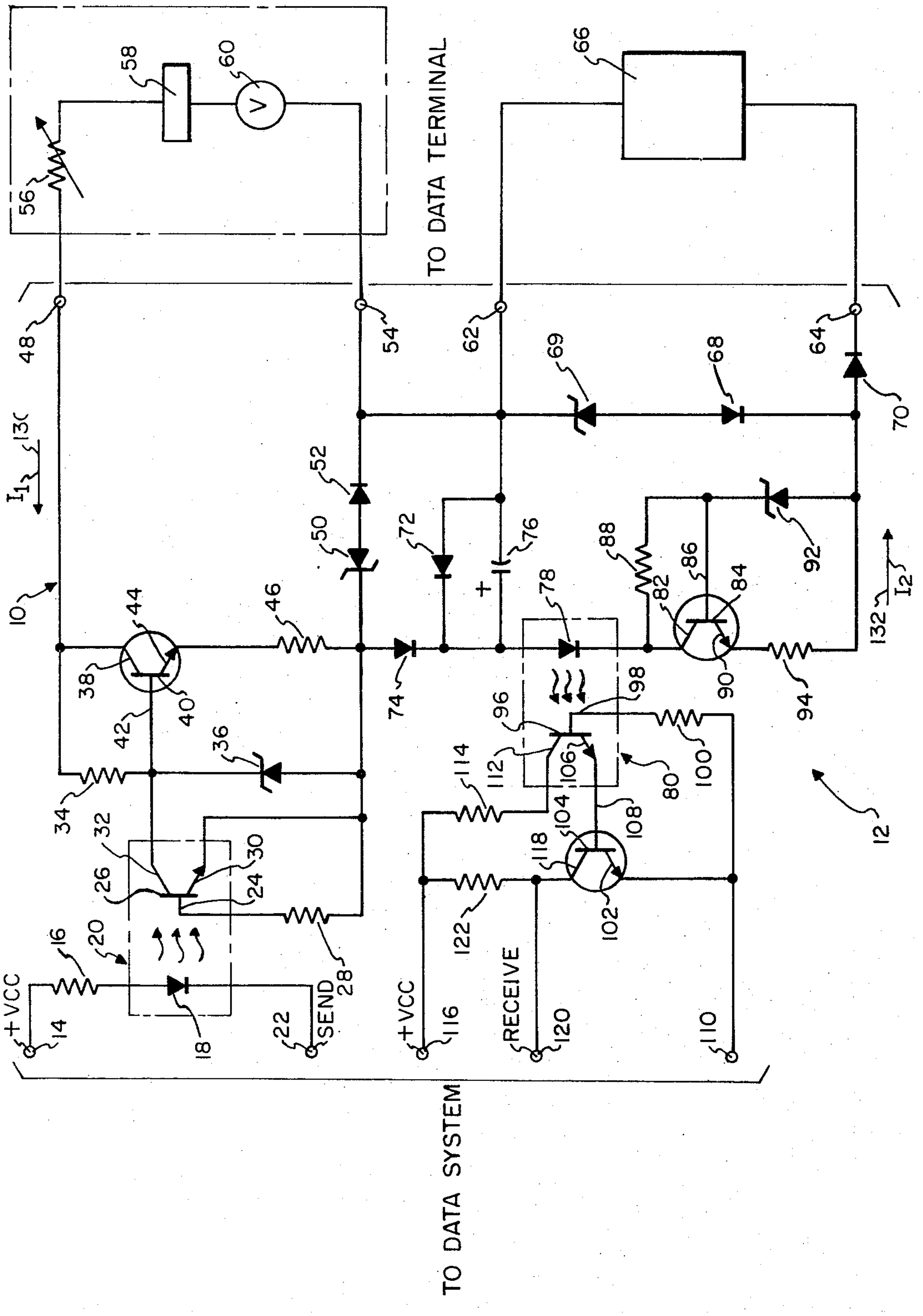
TO DATA TERMINAL
TO DATA SYSTEM
+VCC
SEND
+VCC
RECEIVE

ELECTRONIC DATA TERMINAL INTERFACE

BACKGROUND OF THE INVENTION

1. Field of the Invention

The present invention relates generally to the field of data transmission and data processing and more particularly to an improved electronic data terminal interface circuit for use between a data terminal and a data system.

2. Description of the Prior Art

Advanced interactive data systems use a data terminal for real time communications between the human operator or data terminal link and the control system. Typically this data terminal takes the form of a teletypewriter or a cathode ray display with keyboard. In most cases the data terminals can not be connected directly to the control system which might be a datamodem, electronic testing system or other data system. An interface is normally required to isolate the data terminal from the data system with the interface providing level shifting and electrical noise isolation to prevent electrical noise generated within or near the data terminal from entering the control system. Previous electronic data terminal interface circuits have utilized relay interfaces powered by the data system. The send channels are powered by the data terminal power supply and the receive channel is powered by the data system or a separate supply. This approach however does not provide complete isolation, utilizes relays or requires additional power supplies. Under such circumstances it is desirable to eliminate these relays and supply connections to the data system from the receive channel in the interest of electrical noise isolation and economy.

OBJECTS AND SUMMARY OF THE INVENTION

Accordingly, it is a principal object of the present invention to provide an electronic data terminal interface that provides the required level shifting, ground isolation and noise rejection having the receive channel powered by the same power supply normally furnished with the data terminal which also powers the send channel.

Another object of the invention is to provide an electronic data terminal interface circuit that uses optical isolators to provide ground isolation and noise rejection.

A further object of the invention is to provide an interface circuit that utilizes all solid state components to provide for the elimination of relays or reed switches with a resultant cost savings and economy of space.

These and other objectives of the present invention are achieved by providing an improved interface circuit between a data terminal and a data system. The interface circuit includes send channel means and receive channel means powered by the send channel means.

Other objects will appear from time to time in the ensuing specification, drawing and claims.

A BRIEF DESCRIPTION OF THE DRAWING

The single appended FIGURE is a schematic diagram representation of the electronic data terminal interface circuit of the present invention.

DESCRIPTION OF PREFERRED EMBODIMENT

The electronic data terminal interface circuit illustrated in the figure includes send channel means referred to generally as 10 and receive channel means referred to generally as 12. The interface circuit is connected between a data terminal and a data system which might include such systems as data modems, central processors or other electronic systems. The data terminal may be a teletypewriter or a cathode ray display with keyboard.

The send channel means 10 is connected to the $V_{cc}$ supply lead 14 of the data system through a resistor 16. The $V_{cc}$ supply lead may be a suitable logic supply voltage such as +5 volts d.c.. The other end of resistor 16 is connected to the anode of a light emitting diode 18 of an optical isolator 20. The cathode of the light emitting diode 18 is connected to the send terminal 22 of the data system. The base lead 24 of photo-sensitive transistor 26 included in the optical isolator 20 is connected through a resistor 28 to the emitter lead 30 of the photo-sensitive transistor 26. The collector 32 of photo transistor 26 is connected to one end of a resistor 34 and also to the cathode of a Zener diode 36. The anode of diode 36 is connected to the emitter lead 30 of photo transistor 26. The other end of resistor 34 is connected to the collector 38 of an npn transistor 40. The base lead 42 of transistor 40 is connected to the junction of resistor 34, diode 36 and the collector 32 of transistor 26. The emitter lead 44 of transistor 40 is connected through a resistor 46 to the anode of Zener diode 36. The collector lead 38 of transistor 40 also forms the output terminal 48 of the send channel means 10. The junction of resistor 46 and the anode of diode 36 is connected to the cathode of a Zener diode 50 whose anode is connected to the anode of a diode 52 whose cathode forms a second output 54 of the send channel means 10. The two outputs 48 and 54 of the send channel means 10 are connected through the series combination of a rheostat 56, a selector magnet or driver 58 and a power supply 60 all contained in the data terminal. The selector magnet or driver 58 of the data terminal is a conventional component that controls selector bars or relay control drivers within the data terminal, commonly a teletypewriter. The function of the rheostat 56, the selector magnet 58 and the power supply 60 will be described in more detail hereinafter.

The receive channel means 12 includes two inputs, 62 and 64 that are connected in series through the data terminal by means of a metallic contact represented as 66 which may be a keyboard output or other conventional contact closure. This closure contact 66 may or may not be isolated from the ground system of the data terminal. The input 62 of receive channel means 12 is connected to the cathode of a Zener diode 69 whose anode is connected to the anode of a diode 68. The cathode of diode 68 is connected to the anode of a diode 70 whose cathode is connected to the second input 64 of the receive channel means 12. The input 62 of receive channel means 12 is also connected to the output 54 of the send channel means 10. The cathode of Zener diode 69 is connected to the anode of a diode 72 whose cathode is connected to the cathode of a diode 74 whose anode is connected to the junction of resistor 46 and the cathode of Zener diode 50 in send channel means 10. A capacitor 76 is connected in parallel with the diode 72. Connected to the cathodes of diode 72 and 74 is the anode of a light emitting diode 78 contained in an optical isolator 80. The cathode of diode 78 is connected to the collector 82 of an npn transistor 84. The base lead 86 of transistor 84 is connected to the collector 82 through a resistor 88. The emitter 90 of transistor 84 is connected to the anode of a Zener diode 92 through a resistor 94. The cathode of Zener diode 92 is connected to the base lead 86 of transistor 84. The junction of the Zener diode 92 and resistor 94 are also connected to the anode of diode 70.

Optical isolator 80 also includes a photo-sensitive transistor 96 whose base lead 98 is connected through a resistor 100 to the emitter lead 102 of an npn transistor 104. The emitter lead 106 of photo-sensitive transistor 96 is connected to the base lead 108 of transistor 104. The emitter lead 102 of transistor 104 forms an output 110 of the receive channel means which is connected to the negative supply lead of the data system. The collector 112 of photo-sensitive transistor 96 is connected through a resistor 114 to the positive supply lead $V_{cc}$ of the data system forming a second output 116 of the receive channel means 12. The collector lead 118 of transistor 104 forms a third output 120 of the receive channel means 12 and is connected to the receive logic signal lead of the data system. A resistor 122 is connected between the outputs 116 and 120 of the receive channel means 12.

In operation the send channel means 10 transmits a series of data pulses which may be in standard ASCII code format from the data system to the data terminal and correspondingly a train of data pulses is transmitted from the data terminal to the data system by means of the receive channel means 12. The train of data pulses in either direction are timed for compatibility between the data terminal and the data system. In send channel operation, the data pulses are formed by means of the send lead 22 being pulled down from a logical one level to a logical zero level by the data system circuitry.

When the send lead 22 is at a logical one level near the $V_{cc}$ reference potential 14, no current flows through the light emitting diode 18 of optical isolator 20 and correspondingly the photo-sensitive transistor 26 is in an off condition. In this mode, a "mark" mode current I, designated as 130 flows from the terminal power supply 60 which is commonly 120 volts dc, through the selector magnet 58, rheostat 56 and through transistor 40. Resistor 34, transistor 40, Zener diode 36 and bias resistor 46 limit current I, to a maximum value of about 25 milliamps. This value is sufficient to supply the required operating current of the data terminal selector magnet or driver 58. The data terminal recognizes a flow of current in the 20 milliamp range as a "mark" through the selector magnet or driver 58. When the send output terminal or lead 22 is pulled down to a logical zero level near the ground reference of the $V_{cc}$ supply of the data system, current flows through the light emitting diode 18 of optical isolator 20 and correspondingly the photosensitive transistor 26 is turned on. When transistor 26 is turned on transistor 40 is turned off and consequently the I, current 130 drops from the 20 milliamp range to approximately ½ milliamp. This is recognized as a "space" signal to the data terminal by means of the reduced current flowing through the selector magnet or driver 58.

Accordingly it can be seen that as the send terminal 22 switches from a logical one to a logical zero level by means of the data system logic, current I, changes from a high level in the 20 milliamp range to a low level at the one-half milliamp range corresponding to mark and space signal pulses recognized by the data terminal for transmission. Resistor 16 is chosen to limit the current through light emitting diode 18 and resistor 28 functions to enhance the switching speed of the photosensitive transistor 26 of optical isolator 20. Zener diode 50 is utilized to power the receive channel means 12 as will be explained in detail hereinafter and diode 52 is provided for reverse polarity protection. Rheostat 56 is normally adjusted to provide a mark pulse providing approximately 20 milliamps of current flow I, designated as 130.

In the receive channel means 12, Zener diode 50 charges capacitor 76 in the receive channel means through diode 74 when the send channel means 10 is in a mark condition with the current I, flowing. The data terminal output at terminal 62 and 64 is conventionally a metallic contact designated as 66 isolated from ground. Transistor 84, resistor 88, resistor 94 and Zener diode 92 form a current source with values chosen to establish a current flow I2, designated 132, of approximately 3.5 milliamps. When the data terminal contact 66 is closed, signifying a mark condition, current I2 flows through transistor 84, resistor 94, the contact 66, capacitor 76 and the light emitting diode 78 of optical isolator 80. With current I2 flowing, photosenstitive transistor 96 is activated by the light emitting diode 78 of optical isolator 80 and supplies base current to transistor 104 which pulls the receive lead or terminal 120 down from the $V_{cc}$ potential or logical one level to a logical zero level near the ground reference potential 110 of the data system. The mark signal to the data system is then a zero logical level. When the data terminal contact 66 is open, a space condition, I2 drops to a low current leakage level. With almost zero current flowing through the light emitting diode 78 of optical isolator 80, photo-sensitive transistor 96 is turned off with the receive lead 120 of the data system being pulled up to a logical one level near the $V_{cc}$ supply potential of the data system.

As the contact 66 opens and closes, corresponding to space and mark conditions, the receive lead 120 switches between a logical one and a logical zero level. The data system then provides conventional timing and serial to parallel conversion of the train of mark and space pulses which are defined by the ASCII code. Resistor 114 limits the current through photo-sensitive transistor 96 and the base emitter junction of transistor 104. Resistor 122 functions as a logic pull-up resistor and also as a current limiter for transistor 104. Resistor 100 is utilized to enhance the switching speed of the photo-sensitive transistor 96 of optical isolator 80. Diodes 74, 72, 69, 68, 70 and 52 are utilized to provide reverse polarity protection.

The normal idling state for the data terminal in the send channel means 10 is a mark current of 20 milliamps for current I, which charges capacitor 76 to a voltage approximately equal to the Zener voltage of diode 50. When the send channel is active, current I, will not be a stable 20 milliamps but will be a function of the serial ASCII code utilized by the data terminal as a series of mark and space pulses are transmitted. The worst case condition for powering the receive channel means 12 from the send channel means 10, is a series of characters, commonly called "rub-outs", in the send channel comprised of 18 percent mark signal with a corresponding steady mark signal in the receive channel. Proper selection of the values for Zener diode 50, capacitor 76 and current I2 designated 132 allow full duplex operation of the electronic data terminal interface under all operating conditions including the worst case example. All other operating conditions exhibit a higher duty cycle or percentage of mark signaling on the send channel and correspondingly, the voltage across capacitor 76 will be above the worst case example of a series of rub-out characters. It should be understood however that a suitable selection of values for the various parameters could be optimized to provide for unusual operating conditions and various loading impedances.

The electronic data terminal interface circuit then provides the required level shifting, ground isolation and noise rejection with the receive channel means 12 being powered through the send channel means 10 which derives its supply from the power source furnished with the data terminal equipment. The present invention then preserves noise rejection and reliability while eliminating the necessity of a separate receive channel power supply.

As an illustrative example of the invention, the following combination of circuit elements has been found to be satisfactory although they should not be interpreted as design limiting or optimum:

| | |
|---|---|
| Transistor 40 | 2N4240 or equivalent |
| Transistor 104 | 2N708 or equivalent |
| Transistor 84 | 2N2218 or equivalent |
| Diode 36 | 5.6 volts Zener |
| Diode 92 | 5.6 volts Zener |
| Diode 50 | 47 volts Zener |
| Diode 69 | 47 volts Zener |
| Diodes 74, 52, 72, 68, and 70 | 1N4004 or equivalent |
| Optical isolators 20, 80 | MC T2 (Monsanto device or equivalent) |
| Resistor 16 | 500 ohms |
| Resistor 34 | 200 K ohms |
| Resistor 28 | 100 K ohms |
| Resistor 46 | 200 ohms |
| Resistor 122 | 1.5 K ohms |
| Resistor 114 | 1.5 K ohms |
| Resistor 94 | 1.5 K ohms |
| Resistor 100 | 1 megohms |
| Resistor 88 | 56.2 K ohms |
| Capacitor 76 | 20 microfarads, 50 volts |

Whereas the preferred form of the invention has been shown and described herein it should be realized that there may be many modifications, substitutions and alterations thereto without departing from the teachings of the invention.

Having described what is new and novel and desired to secure by letters patent, what is claimed is:

1. An electronic data terminal interface circuit connected between a data system and a data terminal, said data terminal including send driver means for recognizing data pulse signals in a code format, passive receive control means for providing mark and space pulse signals in a code format, and a dc power supply; said data system including send and receive signaling paths capable of recognizing and generating data pulses in a pulse train of code format; said electronic data terminal interface circuit comprising:

send channel means for providing level shifting, ground isolation and noise rejection having an input connected to the send signaling path output of said data system and having an output connected to the series combination of the driver means and the dc power supply of said data terminal, and separate receive channel means providing level shifting, ground isolation and noise rejection having an input connected to the receive control means and having an output connected to the receive signaling path input of said data system, said send channel means including electronic power storage means for supplying said separate receive channel means, said electronic power storage means being charged from the dc power supply of said data terminal.

2. The interface circuit of claim 1 further characterized in that said receive channel means and said send channel means each include optical isolator means for providing noise rejection and ground isolation between the data system and the data terminal, said optical isolator means each including a light emitting element and a photo-sensitive control element.

3. The interface circuit of claim 2 further characterized in that said electronic power storage means includes a Zener diode and a capacitor operably connected to said receive channel means to limit the current and voltage storage characteristics so as to protect and supply said receive channel means.

4. An interface circuit as recited in claim 3 wherein said send channel means includes semiconductor means for limiting the output current to said data terminal, said send current limiting means being connected between said send channel optical isolator means and the output of said send channel means.

5. An interface circuit as recited in claim 4 wherein said send current limiting means includes semiconductor means for protecting against reverse polarity connection damage, said send channel reverse polarity protection means being connected at the output of said send channel means.

6. An interface circuit as recited in claim 3 wherein said receive channel means includes semiconductor means for limiting the input current to said interface circuit and through said passive receive control means of said data terminal, said receive current limiting means being connected between said receive channel optical isolator means and said passive receive control means of said data terminal.

7. An interface circuit as recited in claim 6 wherein said receive current limiting means includes semiconductor means for protecting against reverse polarity connection damage, said receive channel reverse polarity protection means being connected to said receive control means of said data system.

* * * * *